US010573306B2

(12) United States Patent
Gao et al.

(10) Patent No.: US 10,573,306 B2
(45) Date of Patent: Feb. 25, 2020

(54) METHOD AND DEVICE FOR PROCESSING DATA BASED ON SPEECH RECOGNIZING AND SCORING SYSTEM

(71) Applicant: BAIDU ONLINE NETWORK TECHNOLOGY (BEIJING) CO., LTD., Beijing (CN)

(72) Inventors: Yonghu Gao, Beijing (CN); Yiping Peng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 51 days.

(21) Appl. No.: 15/729,680

(22) Filed: Oct. 11, 2017

(65) Prior Publication Data
US 2018/0286393 A1 Oct. 4, 2018

(30) Foreign Application Priority Data
Mar. 28, 2017 (CN) .......................... 2017 1 0193915

(51) Int. Cl.
*G10L 15/22* (2006.01)
*G10L 25/27* (2013.01)
*G10L 15/02* (2006.01)
*G10L 15/28* (2013.01)

(52) U.S. Cl.
CPC .............. *G10L 15/22* (2013.01); *G10L 15/02* (2013.01); *G10L 15/28* (2013.01); *G10L 25/27* (2013.01)

(58) Field of Classification Search
USPC ................................. 704/246, 247, 251, 252
See application file for complete search history.

(56) References Cited

U.S. PATENT DOCUMENTS

| 2011/0010715 A1* | 1/2011 | Papakipos | G06F 9/5027 718/100 |
| 2012/0159464 A1* | 6/2012 | Demetriou | G06F 8/45 717/148 |
| 2013/0061230 A1* | 3/2013 | Papakipos | G06F 9/5027 718/102 |
| 2016/0021384 A1* | 1/2016 | Croxford | G06T 1/00 375/240.12 |
| 2016/0314789 A1* | 10/2016 | Marcheret | G10L 15/25 |

FOREIGN PATENT DOCUMENTS

| CN | 1540508 | 10/2004 |
| CN | 101826263 | 9/2010 |

OTHER PUBLICATIONS

SIPO, First Office Action for CN Application No. 201710193915.2, dated Sep. 29, 2019.

* cited by examiner

*Primary Examiner* — Leonard Saint Cyr
(74) *Attorney, Agent, or Firm* — Hodgson Russ LLP

(57) ABSTRACT

Embodiments of the present disclosure provide a method and a device for processing data based on a speech recognizing and scoring system. The method includes: acquiring at least one data frame to be processed from each of a plurality of threads to obtain a plurality of data frames; performing a frame splicing process on the plurality of data frames to obtain a spliced data frame, and determining the spliced data frame as a target data frame; and determining a target thread from the plurality of threads, and processing the target data frame based on the target thread.

6 Claims, 2 Drawing Sheets

METHOD AND DEVICE FOR PROCESSING DATA BASED ON SPEECH RECOGNIZING AND SCORING SYSTEM

CROSS-REFERENCE TO RELATED APPLICATION

This application claims priority to and benefits of Chinese Patent Application Serial No. 201710193915.2, filed with the State Intellectual Property Office of P. R. China on Mar. 28, 2017, the entire content of which is incorporated herein by reference.

TECHNICAL FIELD

The present disclosure relates to the field of speech recognition technology, and more particularly, to a method and a device for processing data based on a speech recognizing and scoring system.

BACKGROUND

In the related art, based on a principle of a speech recognizing and scoring system, after speeches of users are received, speech feature data is extracted with respect to the speech of each user, and then a plurality of threads are started. Each of the plurality of threads is configured to process the speech feature data of each user, and to generate an acoustic model score for the speech feature data, such that the acoustic model score is used subsequently in a speech recognizing system. A scheduling module may be pre-set in the speech recognizing and scoring system. The scheduling module is configured to schedule the plurality of threads based on computing resources of a server or of an electronic device, such that the plurality of threads process the speech feature data in serial.

In this manner, a complete data processing procedure is needed for each thread. Furthermore, it requires to a unified scheduling of the plurality of threads. Therefore, a large delay is caused in the data processing, more resources are consumed in the data processing and an efficiency of the data processing is low.

SUMMARY

Embodiments of the present disclosure seek to solve at least one of the problems existing in the related art to at least some extent.

Accordingly, a first objective of the present disclosure is to provide a method for processing data based on a speech recognizing and scoring system, which may improve a data processing efficiency based on the speech recognizing and scoring system, and may save system resources consumed by the processing logic.

Another objective of the present disclosure is to provide a device for processing data based on a speech recognizing and scoring system.

A yet another objective of the present disclosure is to provide a non-transitory computer readable storage medium.

In order to achieve the above objectives, embodiments of a first aspect of the present disclosure provide a method for processing data based on a speech recognizing and scoring system. The method includes: acquiring at least one data frame to be processed from each of a plurality of threads to obtain a plurality of data frames; performing a frame splicing process on the plurality of data frames to obtain a spliced data frame as a target data frame; and determining a target thread from the plurality of threads, and processing the target data frame based on the target thread.

In order to achieve the above objectives, embodiments of a second aspect of the present disclosure provide a device for processing data based on a speech recognizing and scoring system. The device includes: a processor; and a memory configured to store instructions executable by the processor. The processor is configured to: acquire at least one data frame to be processed from each of a plurality of threads to obtain a plurality of data frames; to perform a frame splicing process on the plurality of data frames to obtain a spliced data frame, and determine the spliced data frame as a target data frame; and to determine a target thread from the plurality of threads, and process the target data frame based on the target thread.

In order to achieve the above objectives, embodiments of a third aspect of the present disclosure provide a non-transitory computer readable storage medium. The storage medium has instructions stored therein that, when executed by a processor of a mobile terminal, cause the mobile terminal to execute a method for processing data based on a speech recognizing and scoring system. The method include: acquiring at least one data frame to be processed from each of a plurality of threads to obtain a plurality of data frames; performing a frame splicing process on the plurality of data frames to obtain a spliced data frame, and determining the spliced data frame as target data frames; and determining a target thread from the plurality of threads, and processing the target data frame based on the target thread.

With embodiments of the present disclosure, by performing the frame splicing process to the data frames to be processed of respective threads, the spliced data frame is obtained and determined as the target data frame. Then, the target thread is determined from the plurality of threads, the target data frame is processed based on the target thread. By performing the frame splicing process, it avoids that a complete data processing procedure is needed for each thread. Furthermore, it does not require a unified scheduling of the plurality of threads. Therefore, a data processing efficiency based on the speech recognizing and scoring system may be improved, and system resources consumed by the processing logic may be saved.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
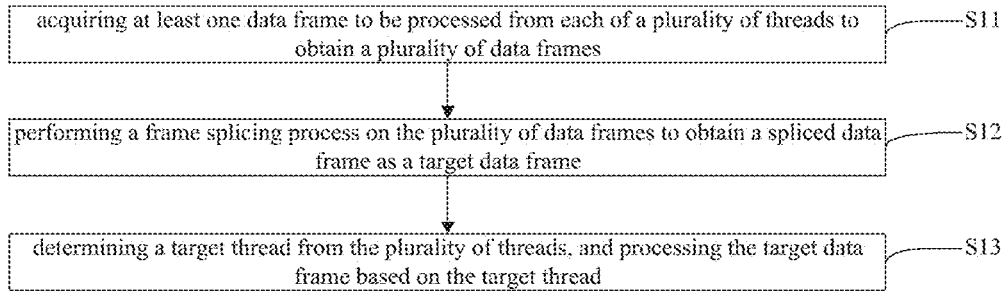
FIG. 1 is a flow chart illustrating a method for processing data based on a speech recognizing and scoring system according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure. Instead, the embodiments of the present disclosure comprise all the variants, modifications and their equivalents within the spirit and scope of the present disclosure as defined by the claims.

FIG. 1 is a flow chart illustrating a method for processing data based on a speech recognizing and scoring system according to an embodiment of the present disclosure.

The method provided in embodiments may be applied in a device for processing data based on a speech recognizing and scoring system.

The device may be arranged in a server or in an electronic device, which is not limited in embodiments of the present disclosure.

The electronic device is for example a personal computer (PC), a cloud device or a mobile device. The mobile device is for example a smart phone, a tablet PC or the like.

It is to be illustrated that, an executive subject of the method provided in embodiments of the present disclosure is for example a central processing unit (CPU) of a server or of an electronic device in a hardware aspect, or is for example a computer program in a server or in an electronic device in a software aspect, which is not limited herein.

The method may be applied into a process of generating an acoustic model score for speech feature data based on an acoustic model in speech recognition by taking the speech feature data as an input.

Referring to FIG. 1, the method includes followings.

At block S11, at least one data frame to be processed is acquired from each of a plurality of threads to obtain a plurality of data frames.

In embodiments of the present disclosure, based on a principle of a speech recognizing and scoring system, after the plurality of threads are started and each thread is provided with speech feature data frames of a corresponding user, the data frames to be processed by each thread of the plurality of threads may be acquired to obtain the plurality of data frames.

At block S12, a frame splicing process is performed on the plurality of data frames to obtain a spliced data frame, and the spliced data frame is determined as a target data frame.

At block S13, a target thread is determined from the plurality of threads, and the target data frame is processed based on the target thread.

In embodiments of the present disclosure, the target thread may be determined based on a load capacity of each thread. That is, for the plurality of threads, a thread having a capacity of processing the target data frame is determined as the target thread. In at least one embodiment, the target thread may be determined randomly. That is, any one of the plurality of threads may be determined as the target thread. How to determine the target thread from the plurality of threads is not limited herein.

After the target thread is determined, other threads may be performed with a mount processing.

In embodiments of the present disclosure, computing resources of a server or of an electronic device are invoked based on the target thread, for executing a logic processing of processing the target data frame. Since the target data frame is processed by the target thread, it avoids that a complete data processing procedure is needed for each thread.

In embodiments of the present disclosure, by performing the frame splicing process on the data frames to be processed of respective threads, the spliced data frame is obtained and determined as the target data frame. Then, the target thread is determined from the plurality of threads, and the target data frame is processed based on the target thread. With the frame splicing process, it avoids that the complete data processing procedure is needed for each thread. Furthermore, it does not require a unified scheduling of the plurality of threads. Therefore, the data processing efficiency based on the speech recognizing and scoring system may be improved, and the system resources consumed by the processing logic may be saved.

In some embodiments, the frame splicing process may be performed on the plurality of data frames, such that the plurality of data frames are mutually crosswise arranged.

By performing the frame splicing process on the plurality of data frames to enable them to be mutually crosswise arranged, it may ensure that data included in the target data frame is processed in parallel by the thread. A processing efficiency is thus improved without influencing a processing preciseness.

In the related art, the speech feature data frames of each user are processed by each thread, to generate an acoustic model score for each speech feature data. The acoustic model score is to be used subsequently in a speech recognizing system.

However, in embodiments of the present disclosure, after the plurality of data frames are obtained by acquiring the data frames to be processed from of the plurality of threads, the frame splicing process is performed on the plurality of data frames. With the frame splicing process, it avoids that a complete data processing procedure is needed for each thread. Furthermore, it does not require a unified scheduling of the plurality of threads. Therefore, a data processing efficiency based on the speech recognizing and scoring system may be improved, and system resources consumed by the processing logic may be saved.

In some embodiments, the number of frames included in the target data frame equals to a value of multiplying the number of the data frames to be processed of each thread by the number of the plurality of threads.

For example, if the number of data frames to be processed by each thread is 4 and there are 3 threads, then after the frame splicing process is performed on the plurality of data frames, the number of frames included in the target data frame is 12.

Figure 2:
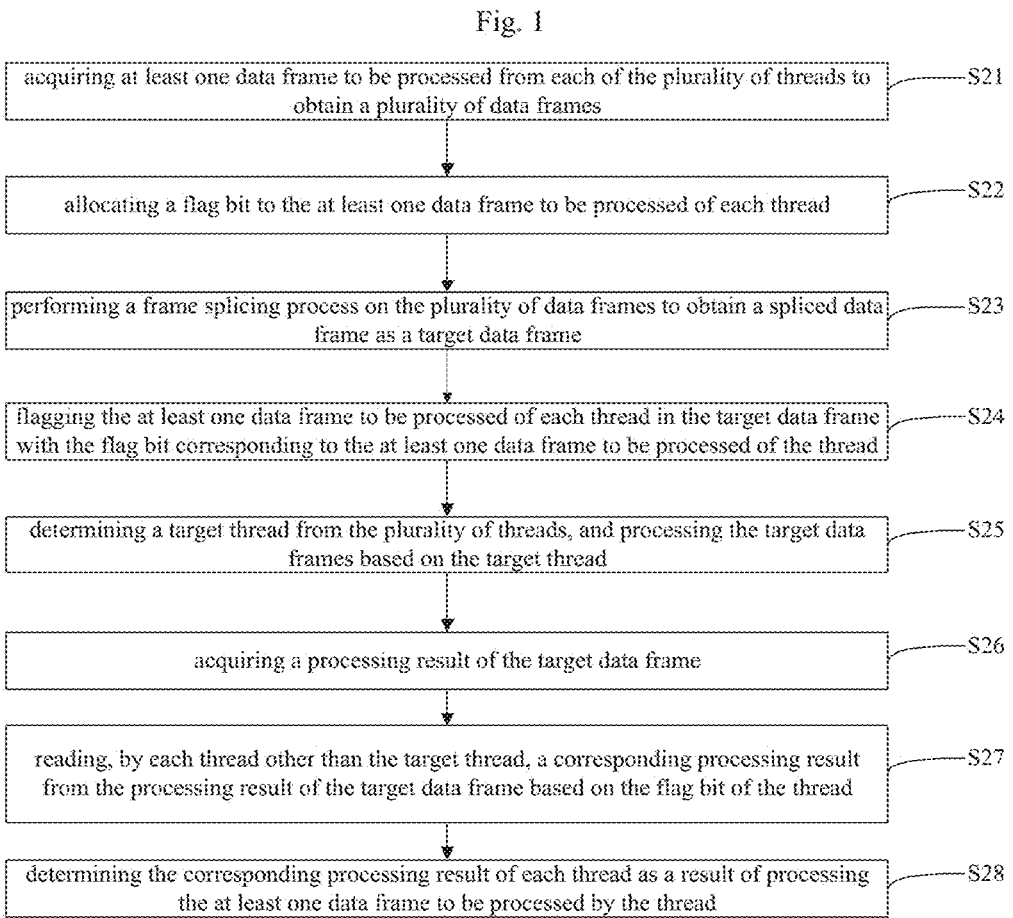
FIG. 2 is a flow chart illustrating a method for processing data based on a speech recognizing and scoring system according to another embodiment of the present disclosure.

FIG. 2 is a flow chart illustrating a method for processing data based on a speech recognizing and scoring system according to another embodiment of the present disclosure.

Referring to FIG. 2, the method includes followings.

At block S21, at least one data frame to be processed is acquired from each of the plurality of threads to obtain a plurality of data frames.

In embodiments of the present disclosure, based on a principle of the speech recognizing and scoring system, after the plurality of threads are started and each thread is provided with speech feature data frames of a corresponding user, the data frames to be processed by each thread may be acquired to obtain the plurality of data frames.

In an example of the present disclosure, the number of the plurality of threads is 3 and the number of data frames to be processed of each thread is 4.

Figure 3:
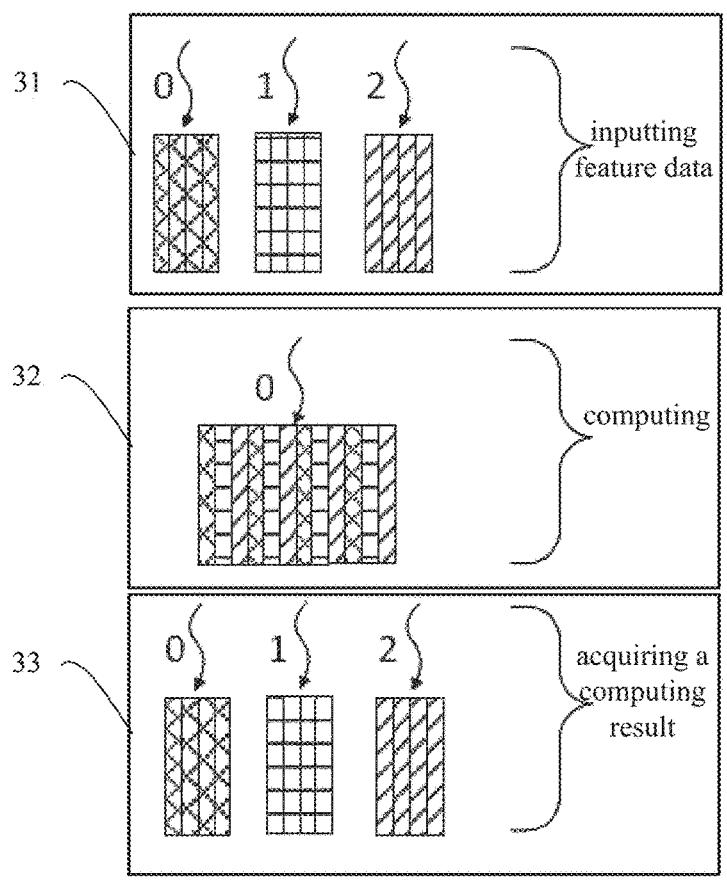
FIG. 3 is a schematic diagram illustrating a scene of a method for processing data based on a speech recognizing and scoring system according to embodiments of the present disclosure.

Referring to FIG. 3, FIG. 3 is a schematic diagram illustrating a scene of a method for processing data based on a speech recognizing and scoring system according to embodiments of the present disclosure. In the scene, three threads 31, a target data frame 32 and a processing result 33 are illustrated.

At block S22, a flag bit is allocated to the at least one data frame to be processed of each thread.

In embodiments of the present disclosure, the flag bit is configured to uniquely identify the data frames to be processed of each thread. The flag bit may be for example an identification (ID) corresponding to the thread.

By allocating the flag bit to the data frames to be processed of each thread in advance, each of the threads other than the target thread can read the processing result corresponding to itself from the processing result of the target data frame based on the its flag bit. Therefore, it may ensure a consistency of an acoustic model score in a subsequent speech recognizing system.

For example, referring to FIG. 3, IDs of the plurality of threads may be 0, 1 and 2 respectively. For each thread, four data frames to be processed may be acquired, and the ID of the thread may be allocated to the data frames to be processed corresponding to the thread. That is, the flag bit of the four data frames to be processed by the thread with the ID of 0 is 0, the flag bit of the four data frames to be processed by the thread with the ID of 1 is 1, and the flag bit of the four data frames to be processed by the thread with the ID of 2 is 2.

At block S23, a frame splicing process is performed on the plurality of data frames to obtain a spliced data frame, and the spliced data frame is determined as a target data frame.

The frame splicing process may be performed on the plurality of data frames as follows.

The frame splicing process may be performed on the plurality of data frames, such that the plurality of data frames are mutually crosswise arranged.

By performing the frame splicing process on the plurality of data frames to enable them to be mutually crosswise arranged, it may ensure that data included in the target data frame is processed in parallel by the thread. A processing efficiency is thus improved without influencing a processing preciseness.

In the related art, the speech feature data frames of each user are processed by each thread, to generate an acoustic model score of each speech feature data. The acoustic model score is to be used subsequently in a speech recognizing system.

However, in embodiments of the present disclosure, after the plurality of data frames are obtained by acquiring the data frames to be processed from the plurality of threads, the frame splicing process is performed on the plurality frames of data. By performing the frame splicing process, it avoids that a complete data processing procedure is needed for each thread. Furthermore, it does not require a unified scheduling of the plurality of threads. Therefore, a data processing efficiency based on the speech recognizing and scoring system may be improved, and system resources consumed by the processing logic may be saved.

In some embodiments, the number of frames included in the target data frame equals to a value of multiplying the number of data frames to be processed of each thread by the number of the plurality of threads.

For example, if the number of data frames to be processed by each thread is 4 and there are 3 threads, then after the frame splicing process is performed on the plurality of data frames, the number of frames included in the target data frame is 12.

Referring to the target data frame 32 as illustrated in FIG. 3, the frame splicing process may be processed on the plurality of data frames, and the plurality of data frames may be mutually crosswise arranged. For example, the first frame included in the four data frames with the flag bit of 0 is determined as the first frame of the target data frame, the first frame included in the four data frames with the flag bit of 1 is determined as the second frame of the target data frame, the first frame included in the four data frames with the flag bit of 2 is determined as the third frame of the target data frame, the second frame included in the four data frames with the flag bit of 0 is determined as the fourth frame of the target data frame, the second frame included in the four data frames with the flag bit of 1 is determined as the fifth frame of the target data frame, the second frame included in the four data frames with the flag bit of 2 is determined as the sixth frame of the target data frame, and so on.

At block S24, the at least one data frame to be processed of each thread in the target data frame is flagged with the flag bit corresponding to the thread.

For example, as illustrated in FIG. 3, the first frame, the fourth frame, the seventh frame, and the tenth frame included in the target data frame are flagged with the flag bit of 0, the second frame, the fifth frame, the eighth frame and the eleventh frame included in the target data frame are flagged with the flag bit of 1, and the third frame, the sixth frame, the ninth frame and the twelfth frame included in the target data frame are flagged with the flag bit of 2.

At block S25, a target thread is determined from the plurality of threads, the target data frame is processed based on the target thread.

In embodiments of the present disclosure, the target thread may be determined based on a load capacity of each thread. That is, for the plurality of threads, a thread with a capacity of processing the target data frame is determined as the target thread. In at least one embodiment, the target thread may be determined randomly. That is, any one of the plurality of threads may be determined as the target thread. How to determine the target thread from the plurality of threads is not limited herein.

After the target thread is determined, other threads may be performed with a mount processing.

In embodiments of the present disclosure, computing resources of a server or of an electronic device are invoked based on the target thread, for executing a logic computing of processing the target data frame. As the target data frame is processed by the target thread, it avoids that a complete data processing procedure is needed for each thread.

Referring to FIG. 3, the target thread may be for example the thread with the ID of 0.

At block S26, a processing result of the target data frame is acquired.

In embodiments of the present disclosure, the processing result of the target data frame processed by the target thread may be acquired.

At block S27, for each thread other than the target thread, a processing result corresponding to the thread is read from the processing result of the target data frame based on the flag bit of the thread.

At block S28, the processing result corresponding to each thread is determined as a result of processing the data frames to be processed by each thread.

For example, referring to the processing result 33 illustrated in FIG. 3, the thread with the ID of 1 can read the processing result corresponding to the flag bit of 1 from the processing result of the target data frame, and the thread with the ID of 2 can read the processing result corresponding to the flag bit of 2 from the processing result of the target data frame. Then, the remaining result included in the processing result of the target data frame processed by the thread with ID of 0 is the processing result corresponding to the flag bit of 0.

The thread in the plurality of threads other than the target thread reads the corresponding processing result from the processing result of the target data frame based on the flag bit, and determines the processing result corresponding to the thread as the result of processing the data frames to be processed by the thread. A structure for processing data based on a speech recognizing and scoring system is simplified. Furthermore, it does not require a unified scheduling of the plurality of threads. The data processing logic is performed by a single thread, such that the other threads can directly read their respective corresponding processing results based on their flag bits, thereby significantly saving computing resources of a processor.

In embodiments of the present disclosure, by allocating the flag bit to the data frames to be processed of each thread in advance, the thread other than the target thread can read the corresponding processing result from the processing result of the target data frame based on the flag bit, thereby ensuring the consistency of the acoustic model score in the subsequent speech recognizing system. By performing the frame splicing process on the plurality of data frames to make them be mutually crosswise arranged, it may ensure that the target thread processes the data included in the target data frame in parallel, thus improving the processing efficiency without influencing the processing preciseness. By performing the frame splicing process on the data frames to be processed of respective threads, the spliced data frame is obtained and determined as the target data frame. Then, by determining the target thread from the plurality of threads, the target data frame is processed based on the target thread. In this way, by performing the frame splicing process, it avoids that the complete data processing procedure is needed for each thread. Furthermore, it does not require a unified scheduling of the plurality of threads. Therefore, the data processing efficiency based on the speech recognizing and scoring system may be improved, and the system resources consumed by the processing logic may be saved. The thread in the plurality of threads other than the target thread reads the corresponding processing result from the processing result of the target data frame based on the flag bit, and determines the processing result corresponding to the thread as the result of processing the data frames to be processed by the thread. A structure for processing data based on a speech recognizing and scoring system is simplified. Furthermore, it does not require a unified scheduling of the plurality of threads. The data processing logic is performed by a single thread, such that the other threads can directly read their respective corresponding processing results based on their flag bits, thereby significantly saving computing resources of a processor.

Figure 4:
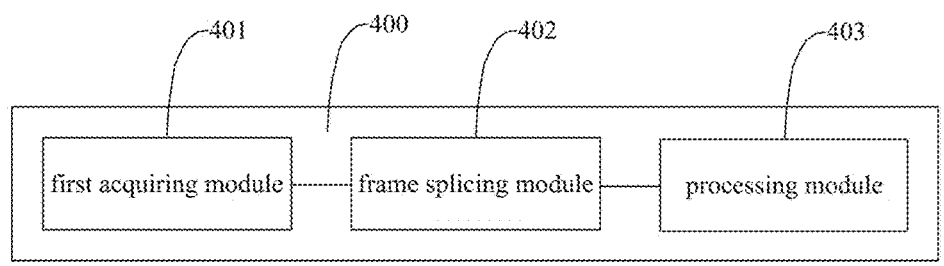
FIG. 4 is a block diagram of a device for processing data based on a speech recognizing and scoring system according to an embodiment of the present disclosure.

FIG. 4 is a block diagram illustrating a device for processing data based on a speech recognizing and scoring system according to an embodiment of the present disclosure.

Referring to FIG. 4, the device 400 includes a first acquiring module 401, a frame splicing module 402 and a processing module 403.

The acquiring module 401 is configured to acquire at least one data frame to be processed from each of a plurality of threads to obtain a plurality of data frames.

The frame splicing module 402 is configured to perform a frame splicing process on the plurality of data frames to obtain a spliced data frame, and to determine the spliced data frame as a target data frame.

In some embodiments, the number of frames included in the target data frame equals to a value of multiplying the number of data frames to be processed of each thread by the number of the plurality of threads.

In some embodiments, the frame splicing module 402 is specifically configured to perform the frame splicing process on the plurality of data frames such that the plurality of data frames are mutually crosswise arranged.

The processing module 403 is configured to determine a target thread from the plurality of threads, and to process the target data frame based on the target thread.

Figure 5:
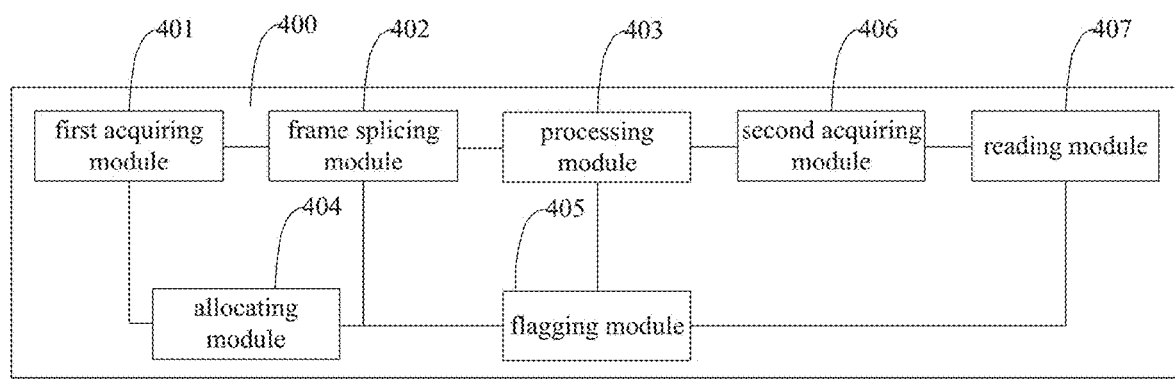
FIG. 5 is a block diagram of a device for processing data based on a speech recognizing and scoring system according to another embodiment of the present disclosure.

In some embodiments, as illustrated in FIG. 5, the device 400 further includes an allocating module 404, a flagging module 405, a second acquiring module 406 and a reading module 407.

The allocating module 404 is configured to allocate a flag bit to the at least one data frame to be processed of each thread.

The flagging module 405 is configured to flag the at least one data frame to be processed of each thread in the target data frame with the flag bit corresponding to the at least data frame to be processed of the thread.

The second acquiring module 406 is configured to acquire a processing result of the target data frame.

The reading module 407 is configured to read, by each of threads other than the target thread, a processing result corresponding to the thread from the processing result of the target data frame based on the flag bit of the thread; and to determine the processing results corresponding to each thread as a result of processing the at least one data frame to be processed by each thread.

It is to be illustrated that, descriptions and illustrations to above embodiments corresponding to the method shown in FIGS. 1 to 3 are suitable for embodiments corresponding to the device 400, an implementation principle of the device is similar to that of the method, which are not elaborated herein.

In embodiments, by performing the frame splicing process on the data frames to be processed of respective threads, the spliced data frame is obtained and determined as the target data frames. Then, the target thread is determined from the plurality of threads, and the target data frame is processed based on the target thread. By performing the frame splicing process, it avoids that a complete data processing procedure is needed for each thread. Furthermore, it does not require a unified scheduling of the plurality of threads. Therefore, a data processing efficiency based on the speech recognizing and scoring system may be improved, and system resources consumed by the processing logic may be saved.

It is to be illustrated, in the description of the present disclosure, terms such as "first" and "second" are used herein for purposes of description and are not intended to indicate or imply relative importance or significance. Furthermore, in the description of the present disclosure, a term of "a plurality of" means two or more than two, unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art; a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for processing data based on a speech recognizing and scoring system, comprising:
    acquiring at least one data frame to be processed from each of a plurality of threads to obtain a plurality of data frames;
    performing a frame splicing process on the plurality of data frames to obtain a spliced data frame as a target data frame; and
    determining a target thread from the plurality of threads, and processing the target data frame based on the target thread;
    wherein performing a frame splicing process on the plurality of data frames comprises:
    performing the frame splicing process on the plurality of data frames, such that the plurality of data frames are mutually crosswise arranged;
    wherein the number of frames comprised in the target data frame is equal to a value of multiplying the number of at least one data frame to be processed of each thread by the number of the plurality of threads;
    allocating a flag bit to the at least one data frame to be processed of each thread; and
    flagging the at least one data frame to be processed of each thread in the target data frame with the flag bit corresponding to the at least one data frame to be processed of the thread.

2. The method according claim 1, after determining the target thread from the plurality of threads and processing the target data frame based on the target thread, further comprising:
    acquiring a processing result of the target data frame;
    reading, by each of threads other than the target thread, a processing result corresponding to the thread from the processing result of the target data frame based on the flag bit of the thread; and
    determining, by each thread, the processing result corresponding to the thread as a result of processing the at least one data frame to be processed by the thread.

3. A device for processing data based on a speech recognizing and scoring system, comprising:
    a processor; and
    a memory, configured to store one or more software modules executable by the processor;
    wherein the one or more software modules comprise:
    a first acquiring software module, configured to acquire at least one data frame to be processed from each of a plurality of threads to obtain a plurality of data frames;
    a frame splicing software module, configured to perform a frame splicing process on the plurality of data frames to obtain a spliced data frame as a target data frame; and
    a processing software module, configured to determine a target thread from the plurality of threads, and to process the target data frame based on the target thread;

wherein the frame splicing software module is configured to:
perform the frame splicing process on the plurality of data frames such that the plurality of data frames are mutually crosswise arranged;
wherein the number of frames comprised in the target data frame is equal to a value of multiplying the number of at least one data frame to be processed of each thread by the number of the plurality of threads;
an allocating software module, configured to allocate a flag bit to the at least one data frame to be processed of each thread; and
a flagging software module, configured to flag the at least one data frame to be processed of each thread in the target data frame with the flag bit corresponding to the at least data frame to be processed of the thread.

4. The device according to claim 3, wherein the one or more software modules further comprise:
a second acquiring software module, configured to acquire a processing result of the target data frame; and
a reading software module, configured to read, by each of threads other than the target thread, a processing result corresponding to the thread from the processing result of the target data frame based on the flag bit of the thread; and to determine the processing results corresponding to each thread as a result of processing the at least one data frame to be processed by each thread.

5. A non-transitory computer readable storage medium, having stored therein instructions that, when executed by a processor of an electronic device, cause the electronic device to perform a method for processing data based on a speech recognizing and scoring system, the method comprising:
acquiring at least one data frame to be processed from each of a plurality of threads to obtain a plurality of data frames;
performing a frame splicing process on the plurality of data frames to obtain a spliced data frame as a target data frame; and
determining a target thread from the plurality of threads, and processing the target data frame based on the target thread;
wherein performing a frame splicing process on the plurality of data frames comprises:
performing the frame splicing process on the plurality of data frames, such that the plurality of data frames are mutually crosswise arranged;
wherein the number of frames comprised in the target data frame is equal to a value of multiplying the number of at least one data frame to be processed of each thread by the number of the plurality of threads;
allocating a flag bit to the at least one data frame to be processed of each thread; and
flagging the at least one data frame to be processed of each thread in the target data frame with the flag bit corresponding to the at least one data frame to be processed of the thread.

6. The storage medium according claim 5, wherein after determining the target thread from the plurality of threads and processing the target data frame based on the target thread, the method further comprises:
acquiring a processing result of the target data frame;
reading, by each of threads other than the target thread, a processing result corresponding to the thread from the processing result of the target data frame based on the flag bit of the thread; and
determining, by each thread, the processing result corresponding to the thread as a result of processing the at least one data frame to be processed by the thread.

* * * * *